(12) United States Patent
Mehta et al.

(10) Patent No.: US 11,604,786 B2
(45) Date of Patent: Mar. 14, 2023

(54) METHOD AND SYSTEM FOR PROCESSING UNSTABLE WRITES IN A CLUSTERED FILE SYSTEM

(71) Applicant: EMC IP Holding Company LLC, Hopkinton, MA (US)

(72) Inventors: Viral Kirtikumar Mehta, JamKhambhalia (IN); Omkar Anand Ekbote, Maharashtra (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 899 days.

(21) Appl. No.: 16/396,536

(22) Filed: Apr. 26, 2019

(65) Prior Publication Data

US 2020/0341969 A1 Oct. 29, 2020

(51) Int. Cl.
*G06F 16/23* (2019.01)
*G06F 16/182* (2019.01)
*G06F 16/13* (2019.01)

(52) U.S. Cl.
CPC ........ *G06F 16/2379* (2019.01); *G06F 16/137* (2019.01); *G06F 16/183* (2019.01)

(58) Field of Classification Search
CPC ... G06F 16/2379; G06F 16/183; G06F 16/137
See application file for complete search history.

(56) References Cited

U.S. PATENT DOCUMENTS

| | | | |
|---|---|---|---|
| 7,313,822 B2 * | 12/2007 | Ben-Itzhak | H04L 63/1416 709/224 |
| 8,949,614 B1 * | 2/2015 | Jernigan, IV | H04L 67/1097 713/178 |
| 9,164,947 B1 * | 10/2015 | Borker | G06F 13/4282 |
| 10,474,632 B2 * | 11/2019 | Salyers | G06F 16/9014 |
| 10,621,156 B1 * | 4/2020 | Morkel | G06F 16/2393 |
| 10,853,346 B2 * | 12/2020 | Heman | G06F 16/23 |
| 11,036,677 B1 * | 6/2021 | Grunwald | G06F 16/183 |
| 11,249,943 B2 * | 2/2022 | Jiao | G06F 11/14 |
| 2003/0051036 A1 * | 3/2003 | Wang | H04L 67/2804 709/227 |
| 2006/0075277 A1 * | 4/2006 | Johnson | G06F 9/466 714/4.1 |
| 2006/0212453 A1 * | 9/2006 | Eshel | H04L 67/1034 |
| 2007/0073830 A1 * | 3/2007 | Burnett | G06F 16/10 709/217 |
| 2007/0226320 A1 * | 9/2007 | Hager | G06F 16/137 709/219 |

(Continued)

*Primary Examiner* — Huawen A Peng
(74) *Attorney, Agent, or Firm* — Chamberlain, Hrdlicka, White, Williams & Aughtry (57) ABSTRACT

A method includes receiving, from a client and by a node, a commit request associated with a first datum, sending, in response to the commit request, a second commit request to a second node, wherein the second node comprises the first datum, after sending the second commit request, receiving a first cookie from the second node, making a first determination that the first cookie does not match a second cookie stored in a node cookie hash table, wherein the second cookie is associated with the second node, in response to the first determination, updating a master verifier cookie on the node to obtain an updated master verifier cookie, and sending the updated master verifier cookie to the client.

20 Claims, 9 Drawing Sheets

(56) References Cited

U.S. PATENT DOCUMENTS

| | | | |
|---|---|---|---|
| 2013/0031403 A1* | 1/2013 | Mordani | G06F 11/2041 |
| | | | 714/E11.073 |
| 2013/0041872 A1* | 2/2013 | Aizman | G06F 16/182 |
| | | | 707/690 |
| 2016/0070740 A1* | 3/2016 | Vermeulen | G06F 16/2322 |
| | | | 707/703 |
| 2016/0070771 A1* | 3/2016 | Vermeulen | G06F 11/3006 |
| | | | 707/687 |
| 2016/0364440 A1* | 12/2016 | Lee | G06F 11/1471 |
| 2017/0031599 A1* | 2/2017 | Bowman | G06F 3/0604 |
| 2017/0075916 A1* | 3/2017 | Heemskerk | H04L 67/2842 |
| 2017/0235817 A1* | 8/2017 | Deodhar | G06F 11/2094 |
| | | | 707/736 |
| 2018/0322156 A1* | 11/2018 | Lee | G06F 16/23 |
| 2019/0129888 A1* | 5/2019 | Bowman | G06F 3/0604 |
| 2019/0361888 A1* | 11/2019 | Das | G06F 16/2379 |
| 2019/0370365 A1* | 12/2019 | Chalakov | G06F 16/182 |
| 2019/0392053 A1* | 12/2019 | Chalakov | G06F 16/188 |
| 2020/0034472 A1* | 1/2020 | Cai | G06F 11/3476 |
| 2020/0104393 A1* | 4/2020 | Setty | H04L 63/123 |
| 2021/0026844 A1* | 1/2021 | Koide | H04L 9/3239 |

* cited by examiner

METHOD AND SYSTEM FOR PROCESSING UNSTABLE WRITES IN A CLUSTERED FILE SYSTEM

BACKGROUND

Computing devices may include any number of internal components such as processors, memory, and persistent storage. Each of the internal components of a computing device may be used to generate data. The generated data may need to be stored remotely in storage system. In these scenarios, the computing devices may rely on notifications received from the storage systems to confirm that the data was stored in the storage system.

SUMMARY

In general, in one aspect, the invention relates to a method for storing data in accordance with one or more embodiments of the invention. The method includes receiving, from a client and by a node, a commit request associated with a first datum, sending, in response to the commit request, a second commit request to a second node, wherein the second node comprises the first datum, after sending the second commit request, receiving a first cookie from the second node, making a first determination that the first cookie does not match a second cookie stored in a node cookie hash table, wherein the second cookie is associated with the second node, in response to the first determination, updating a master verifier cookie on the node to obtain an updated master verifier cookie, and sending the updated master verifier cookie to the client.

In one aspect, a non-transitory computer readable medium in accordance with one or more embodiments of the invention includes computer readable program code, which when executed by a computer processor enables the computer processor to perform a method for storing data. The method includes receiving, from a client and by a node, a commit request associated with a first datum, sending, in response to the commit request, a second commit request to a second node, wherein the second node comprises the first datum, after sending the second commit request, receiving a first cookie from the second node, making a first determination that the first cookie does not match a second cookie stored in a node cookie hash table, wherein the second cookie is associated with the second node, in response to the first determination, updating a master verifier cookie on the node to obtain an updated master verifier cookie, and sending the updated master verifier cookie to the client.

In one aspect, a system in accordance with one or more embodiments of the invention includes a processor and memory that includes instructions, which when executed by the processor, perform a method. The method includes receiving, from a client and by a node, a commit request associated with a first datum, sending, in response to the commit request, a second commit request to a second node, wherein the second node comprises the first datum, after sending the second commit request, receiving a first cookie from the second node, making a first determination that the first cookie does not match a second cookie stored in a node cookie hash table, wherein the second cookie is associated with the second node, in response to the first determination, updating a master verifier cookie on the node to obtain an updated master verifier cookie, and sending the updated master verifier cookie to the client.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for writing data in a node cluster. More specifically, embodiments of the invention relate to writing data to a second node based on a write request obtained by a first node and using a combination of master verifier cookies and FM write cookies to determine whether the write request was persistently stored in the second node.

Figure 1A:
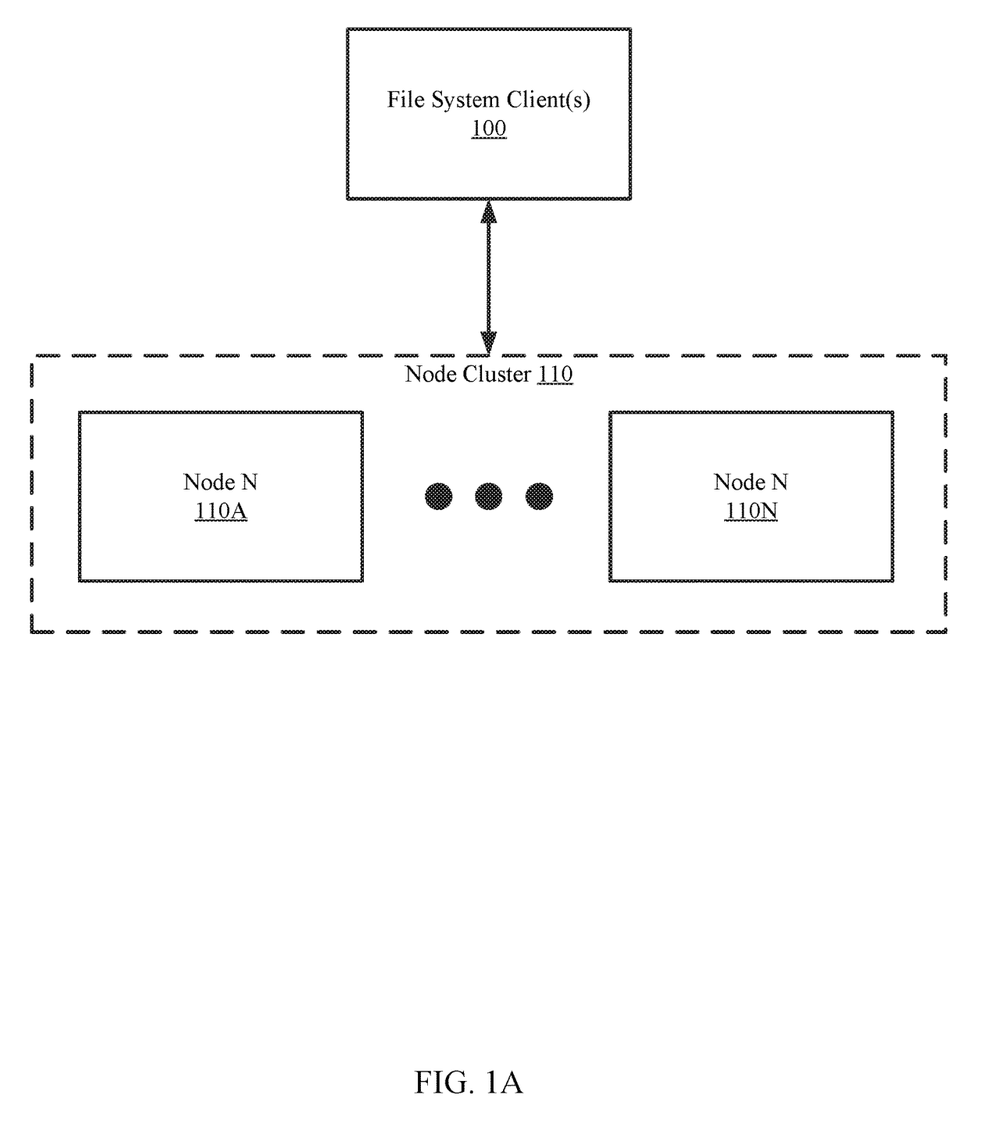
FIG. 1A shows a diagram of a system in accordance with one or more embodiments of the invention.

FIG. 1A shows an example system in accordance with one or more embodiments of the invention. The system includes one or more file system clients (100) and a node cluster (110). The system may include additional, fewer, and/or different components without departing from the invention. Each component may be operably connected via any combination of wired and/or wireless connections. Each component illustrated in FIG. 1A is discussed below.

In one or more embodiments of the invention, the file system clients (100) are computing devices that use the node cluster (110) to store data. The file system clients (100) may send requests to write data and/or commit data that has been written to nodes (110A, 110N) of the node cluster (110). The nodes (110A, 110N) obtaining the requests may respond with a cookie that is to be stored by the file system clients (100) sending the requests. The file system clients (100) may use an obtained cookie to determine whether a request to write/commit data is serviced by the corresponding node (110A, 110N). The file system clients (100) may respond accordingly based on the determination.

Figure 5:
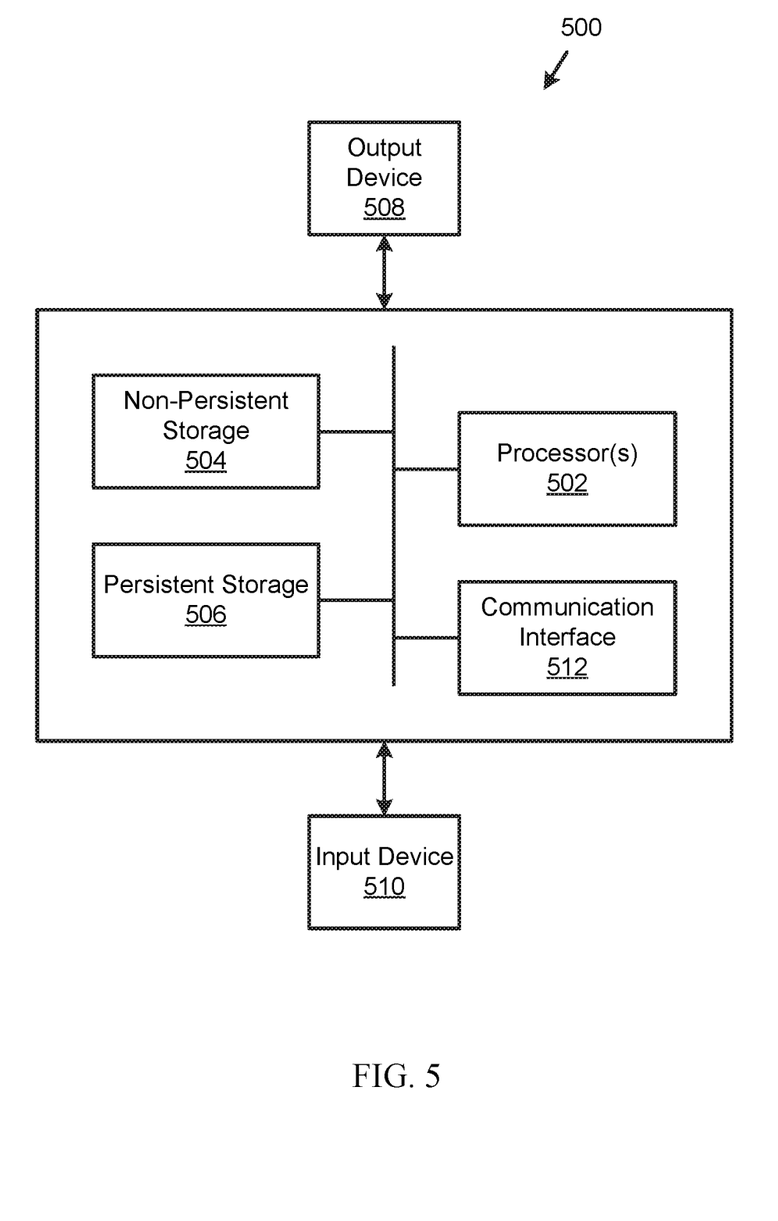
FIG. 5 shows a diagram of a computing device in accordance with one or more embodiments of the invention.

In one or more embodiments of the invention, the file system clients (100) are implemented as a computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the file system clients (100) described throughout this application.

In one or more embodiments of the invention, one or more of the file system clients (100) are implemented as logical devices. The logical device may utilize the computing resources of any number of computing devices and thereby provide the functionality of the file system clients (100) described throughout this application.

In one or more embodiments of the invention, the node cluster (110) is a grouping of nodes (110A, 110N) that, collectively, store data received from file system clients. Each node (110A, 110N) may store one or more files, portions of files, and/or other data associated with a file. A node (110A, 110N) may communicate with a file system client (100) that requests to write and/or commit data in a storage device of the node (110A, 110N) or in a second node (110A, 110N). In one or more embodiments of the invention, the node (110A, 110N) determines which node in the node cluster (110) that services the requests. A request that is to be serviced by the second node (e.g., 110N) may be forwarded by the node (e.g., 110A) obtaining the request. The node (110A) may obtain a response from the second node (110N) after the request has been forwarded. The node (110A) may use the response to send a cookie to the file system client (100) that sent the request.

In one or more embodiments of the invention, the file system clients (100) communicate with the nodes (110A, 110N) in the node cluster (110) using a network file system (NFS) protocol. The NFS protocol may specify formats in which to send communications (e.g., cookies, write requests, and/or other data) between nodes (110A, 110N). Additionally, file system clients (100) communicating with the nodes (110A, 110N) utilize the NFS protocol when communicating with the nodes. Using the NFS protocol, nodes (110A, 110N) may share files, data associated with files, and/or file directories with each other within the node cluster (110). Other protocols, aside from NFS, may be used without departing from the invention.

In one or more embodiments of the invention, one or more nodes (110A, 110N) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the node (110A, 110N) described throughout this application and/or all, or a portion thereof, of the method illustrated in FIG. 3A, 3B.

In one or more embodiments of the invention, one or more nodes (110A, 110N) is implemented as a logical device. The logical device may utilize the computing resources of any number of computing devices and thereby provide the functionality of the nodes (110A, 110N) described throughout this application and/or all, or a portion thereof, of the method illustrated in FIG. 3A-3B. For additional details regarding a node (110A, 110N), see, e.g., FIG. 1B.

Figure 1B:
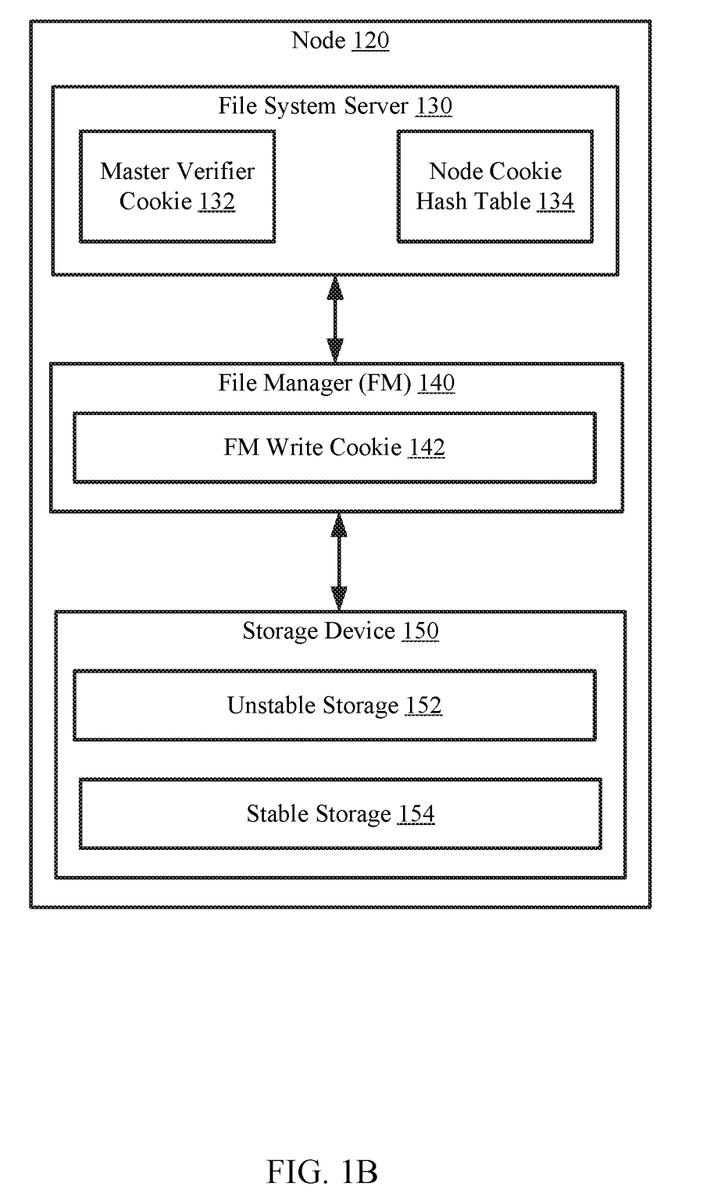
FIG. 1B shows a diagram of a node in accordance with one or more embodiments of the invention.

FIG. 1B shows a diagram of a node (120) in accordance with one or more embodiments of the invention. The node (120) may be similar to a node (110A, 110N, FIG. 1A) discussed above. The node (120) may include a file system server, a file manager (140), and a storage device (150). The node (120) may include additional, fewer, and/or different components without departing from the invention. Each component may be operably connected via any combination of wired and/or wireless connections. Each component illustrated in FIG. 1B is discussed below.

In one or more embodiments of the invention, the file system server (130) manages communication with a file system client (e.g., 100, FIG. 1A). The file system server (130) may obtain requests to write and/or commit data to the storage device (150) of the node (120) or to a storage device of a separate node (not shown). The file system server (120) may communicate the requests to the file manager (140), which manages data stored in the storage device (150).

In one or more embodiments of the invention, the file system server (130) is a NFS server. The NFS server may communicate with a NFS client using the NFS protocol. The NFS server identifies a format in which to communicate with a file manager (i.e., 140) when servicing requests obtained from the NFS client to store data.

In one or more embodiments of the invention, the file system server (130) uses a master verifier cookie when communicating with a client. In one or more embodiments of the invention, the master verifier cookie (132) is a data structure that may be sent to the client after a request to write/commit. The master verifier cookie (130) may be used by a node (110A, 110N) to determine whether unstable data (i.e., data stored in an unstable storage) has been lost. In one or more embodiments of the invention, the node (110A, 110N) uses the master verifier cookie (130) to make the determination due to the master verifier cookie (130) being modified after an event has occurred that causes the unstable data to be lost.

For example, the master verifier cookie (130) may be modified based on whether a node (e.g., 120, or a second node) that serviced a request to store data in an unstable storage (e.g., 152) of the node has been rebooted prior to storing the data in stable storage (e.g., 154) of the node. In one or more embodiments of the invention, the node servicing the request is not the node (120) storing the master verifier cookie (132) (i.e., the node that obtains the request from the client). The master verifier cookie may be used to specify events other than a node reboot that trigger a loss of unstable data without departing from the invention.

In one or more embodiments of the invention, the file system server (130) uses a node cookie hash table (134) to determine whether a node has been rebooted prior to servicing a request. The node cookie hash table (134) is a data structure that specifies nodes of a node cluster and an FM write cookie (i.e., 142) associated with each node. The node cookie hash table (134) includes entries that each include a node identifier and a FM write cookie associated with the node identifier. For additional details regarding the node cookie hash table, see, e.g., FIG. 2.

In one or more embodiments of the invention, the file system server (130) is a physical device operatively connected to the node (120) or integrated within the node (120). The physical device may include circuitry. The physical device may be, for example, a field-programmable gate array, application specific integrated circuit, programmable processor, microcontroller, digital signal processor, or other hardware processor. The physical device may be adapted to provide the functionality of the file system server (130) described throughout this application and/or all, or a portion thereof, of the method illustrated in FIGS. 3A-3B.

Figure 3A:
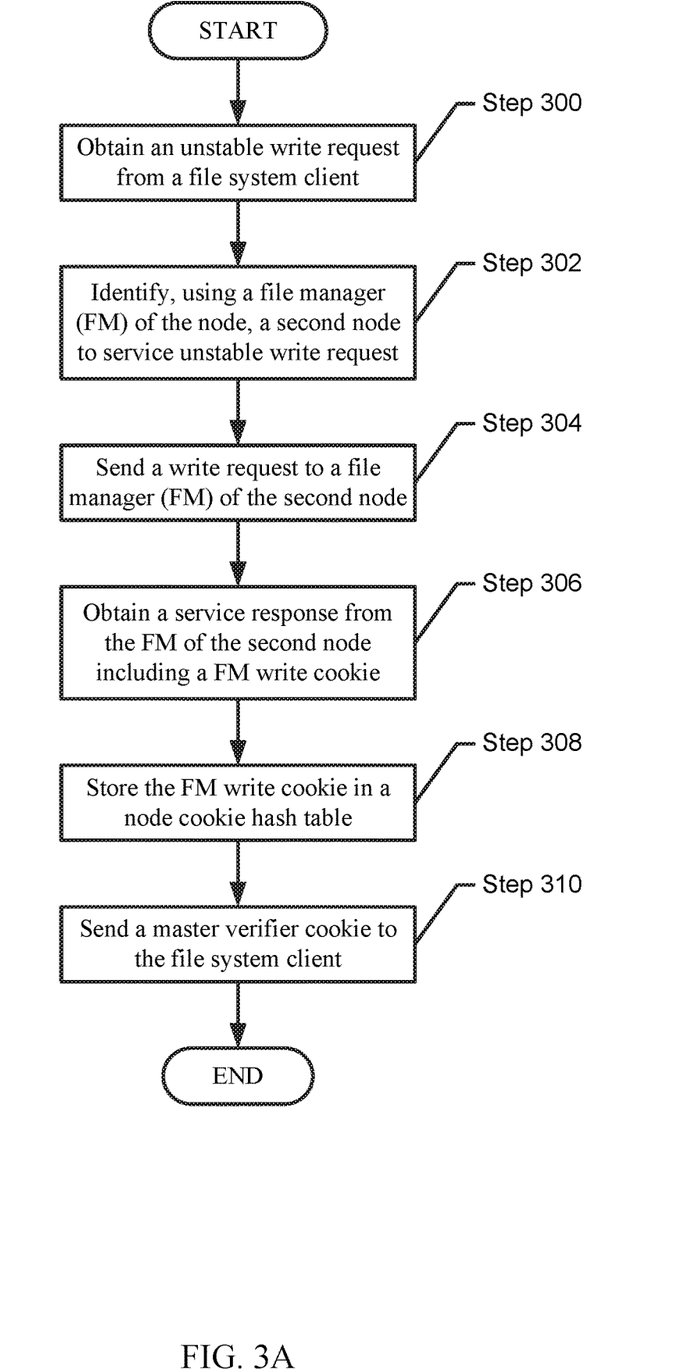
FIG. 3A shows a flowchart for managing unstable write requests in accordance with one or more embodiments of the invention.
Figure 3B:
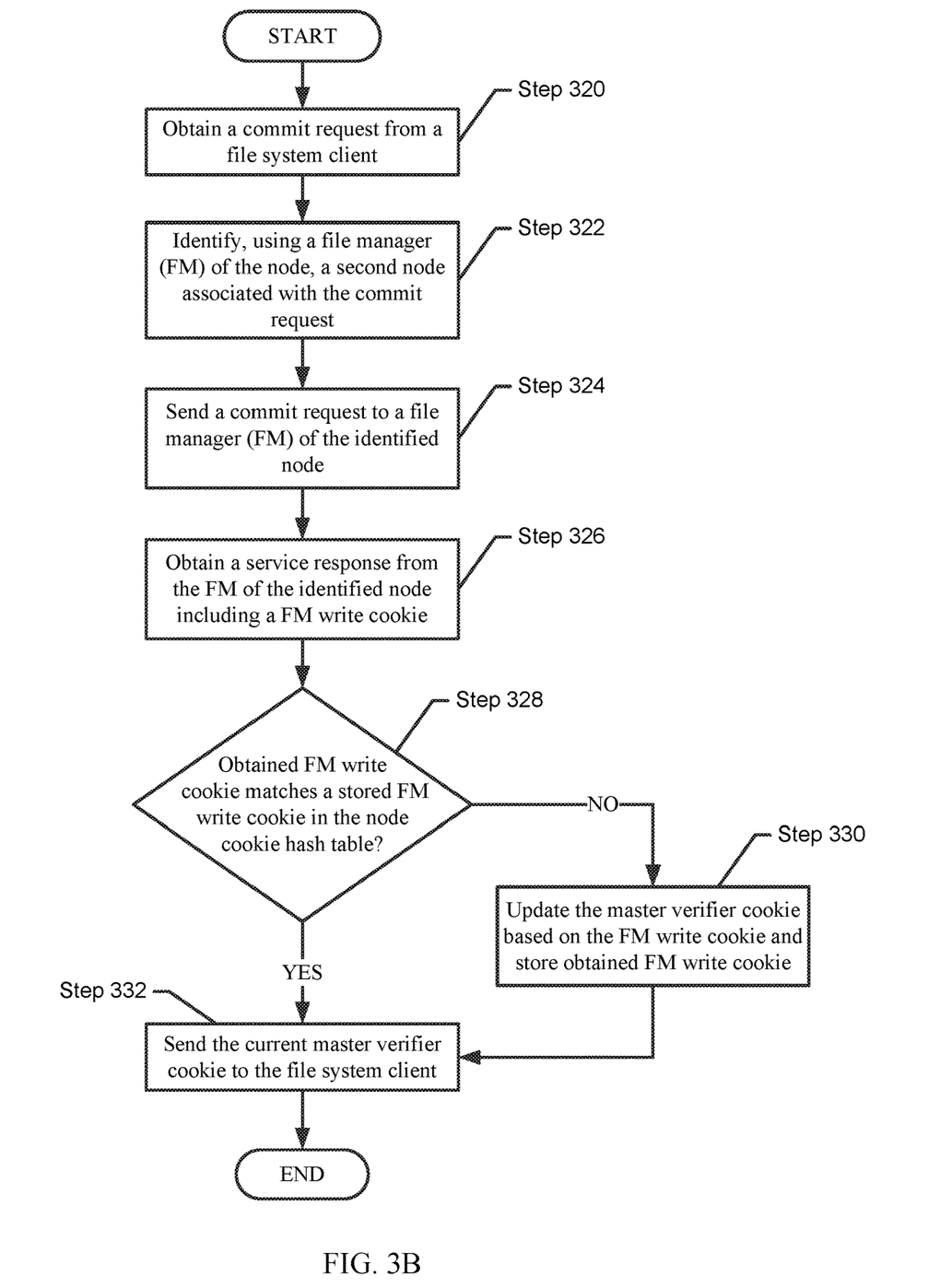
FIG. 3B shows a flowchart for managing commit requests in accordance with one or more embodiments of the invention.

In one or more of embodiments of the invention, the file system server (130) is implemented as computer instructions, e.g., computer code, stored on a persistent storage that when executed by a processor of the node (120) cause the node (120) to provide the functionality of the file system server (130) described throughout the application and/or all, or a portion thereof, of the method illustrated in FIGS. 3A-3B.

In one or more embodiments of the invention, the file manager (FM) (140) manages the data stored in the storage device (150). The file manager (140) may obtain requests to store data either in the unstable storage (152) or stable storage (154). The requests may be obtained from the file system server (130) or from a FM of a different node. In one or more embodiments of the invention, the FM (140) uses metadata stored in a file system to identify where data is to be written. The metadata may be stored in one or more file directories that specify which files are stored in a node cluster of the node (120). Additionally, the metadata may include a node-to-file mapping that specifies the nodes in the node cluster and the files and/or data associated with the files that each node stores. The metadata may further specify the node in which the data is stored, the type of storage (i.e., unstable or stable storage) in which to write the data, and/or other information used to service requests to write/commit without departing from the invention.

In one or more embodiments of the invention, the FM (140) generates a FM write cookie (142) when the node (120) is rebooted. In one or more embodiments of the invention, the FM write cookie (140) is a data structure that is updated (or otherwise modified) based on a reboot of the node (120). The FM write cookie may be associated with a timestamp corresponding to when the reboot of the node (120) last occurred. In one or more embodiments of the invention, the FM write cookie (142) includes a combination of numbers, letters, and/or other symbols that are generated based on a point in time in which the node (120) is rebooted. For example, if the node (120) is rebooted at 07:30 on Mar. 10, 2019, a portion of the FM write cookie (140) may include the timestamp "0730-03-10-2019."

In contrast to the master verifier cookie (132), the FM write cookie (142) is used to determine only whether the node (120) storing the FM write cookie (140) has rebooted; the master verifier cookie (132) may be used to determine whether a separate node has been rebooted.

In one or more embodiments of the invention, the file manager (140) is a physical device that is operatively connected to or integrated within the node. The physical device may include circuitry. The physical device may be, for example, a field-programmable gate array, application specific integrated circuit, programmable processor, microcontroller, digital signal processor, or other hardware processor. The physical device may be adapted to provide the functionality of the file manager (140) described throughout this application and/or all, or a portion thereof, of the method illustrated in FIGS. 3A-3B.

In one or more embodiments of the invention, the file manager (140) is implemented as computer instructions, e.g., computer code, stored on a persistent storage that when executed by a processor of the node (120) cause the node (120) to provide the functionality of the file manager (140) described throughout the application and/or all, or a portion thereof, of the method illustrated in FIGS. 3A-3B.

In one or more embodiments of the invention, the storage device (150) stores data. The data may be associated with a file, a portion of a file, and/or multiple files. The storage device (150) may include stable storage (154) and unstable storage (152).

In one or more embodiments of the invention, the unstable storage (152) is a form of volatile storage that may not store data after a node (120) is rebooted. The unstable storage (152) may be, for example, random access memory (RAM). Data may be written to the RAM based on instructions implemented by the file manager (140). The instructions may be based on an unstable write request obtained by the FM (140).

In one or more embodiments of the invention, the stable storage (154) is a form of non-volatile (i.e., persistent) storage that may continue to store data after a node (120) is rebooted. The stable storage (152) may include, for example, a hard disk drive, a solid state drive, and/or other types of persistent storage without departing from the invention. Data may be written to the stable storage (154) based on instructions implemented by the file manager (140). The instructions may be based on a write request obtained by the FM (140). Additionally, data may be written to the stable storage (154) based on a commit request. In one or more embodiments of the invention, a commit request is a request to commit data to the stable storage (154). Committing data to stable storage (154) may include storing data that was previously stored in the unstable storage (152) to the stable storage (154). In this manner, the data may remain stored by the node (120) after the node (120) is rebooted.

Figure 2:
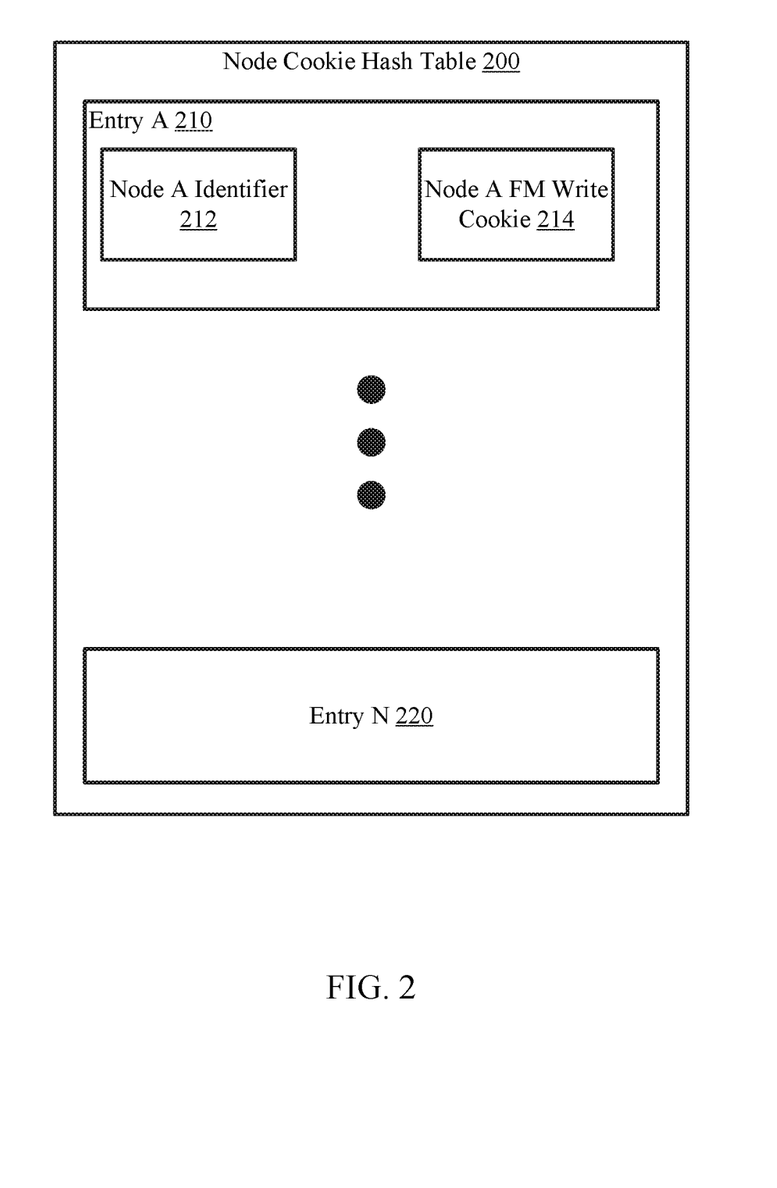
FIG. 2 shows a diagram of a node cookie hash table in accordance with one or more embodiments of the invention.

FIG. 2 shows a diagram of a node cookie hash table. The node cookie hash table (200) may be similar to the node cookie hash table (134, FIG. 1B) discussed above. The node cookie hash table (200) may include entries (210, 220). Each entry (210, 220) may include a node identifier (212) and a FM write cookie (214). The node cookie hash table (200) may be generated, updated, and/or otherwise used by the file system server (130, FIG. 1B) discussed above. The node cookie hash table (200) may include additional, fewer, and/or different data structures without departing from the invention.

In one or more embodiments of the invention, the node identifier (212) is a data structure that identifies (or otherwise specifies) a node of a node cluster. The node identifier (212) may be, for example, a string of characters uniquely corresponding to the node. The node identifier (212) may be, for example, a universally unique identifier (UUID), an IP address, a hash key value, and/or other types of node identifiers without departing from the invention.

In one or more embodiments of the invention, the FM write cookie (214) is a data structure that may be used to identify a time in which the node associated with the corresponding entry (210, 220) has rebooted. In other words, after the node has rebooted, a new FM write cookie (214) may replace the existing FM write cookie (214) of the corresponding entry (210, 220).

FIGS. 3A-3B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3B may be performed in parallel with any other steps shown in FIGS. 3A-3B without departing from the scope of the invention.

FIG. 3A shows a flowchart for servicing unstable write requests in accordance with one or more embodiments of the invention. The method shown in FIG. 3A may be performed by, for example, a node (110A, 110N, FIG. 1A). Other components of the system illustrated in FIG. 1A may perform the method of FIG. 3A without departing from the invention.

Turning to FIG. 3A, in step 300, an unstable write request is obtained from a file system client. In one or more embodiments of the invention, the file system server of the node communicating with the file system client obtains the unstable write request. The unstable write request may specify a datum or data to be stored in unstable storage of a storage device. The storage device may not be of the node communicating with the file system client.

In step 302, in response to the write request, a file manager (FM) of the node identifies a second node to service the write request. The file system server obtaining the unstable write request may forward the unstable write request to the file manager of the second node.

Prior to forwarding the unstable write request, the file system server may modify the unstable write request to be in a format readable to the FM of the second node. The modified write request may be forwarded to the FM of the second node.

In step 304, a write request is sent to a file manager (FM) of the second node. In one or more embodiments of the invention, the write request is the modified write request obtained in step 302. The write request may specify the data that is to be written to the storage device of the second node.

In one or more embodiments of the invention, the FM of the second node services the write request. The FM of the second node may service the write request by identifying the data that is to be written to the storage device and writing the data to the unstable storage of the storage device of the second node.

In step 306, a service response is obtained from the FM of the second node. In one or more embodiments of the invention, the FM of the second node sends the service response after servicing the write request. The service response may include a confirmation that the write request is serviced. Additionally, the service response may include a FM write cookie and a node identifier associated with the second node.

In step 308, the file system server of the node stores the FM write cookie in a node cookie hash table. In one or more embodiments of the invention, the file system server searches the node cookie hash table for an entry associated with the FM write cookie. An entry is associated with the FM write cookie if a node identifier of the entry matches the node identifier of the second node (e.g., the node identifier obtained with the FM write cookie). If no such entry is identified in the node cookie hash table, a new entry may be generated. The entry may be populated with the node identifier of the second node and the FM write cookie. If an entry is identified in the node cookie hash table, the FM write cookie of the entry may be replaced with the obtained FM write cookie.

In step 310, a master verifier cookie is sent to the file system client by the master verifier cookie. In one or more embodiments of the invention, the master verifier cookie is generated by the file system server in response to obtaining the unstable write request. The file system server may generate the master verifier cookie prior to sending the write request to the FM of the node. Alternatively, the file system server generates the master verifier cookie after obtaining the service response.

In one or more embodiments of the invention, the file system client may store the master verifier cookie. The master verifier cookie may be used by the file system client to determine whether a request to commit the data associated with the unstable write request is serviced.

FIG. 3B shows a flowchart for servicing commit requests in accordance with one or more embodiments of the invention. The method shown in FIG. 3B may be performed by, for example, a node (110A, 110N, FIG. 1A). Other components of the system illustrated in FIG. 1A may perform the method of FIG. 3B without departing from the invention.

Turning to FIG. 3B, in step 320, a commit request is obtained from a file system client. In one or more embodiments of the invention, the file system server of the node communicating with the file system client obtains the commit request. The commit request may specify a datum or data to be stored in stable storage of a storage device. Additionally, the commit request may specify the datum or data of FIG. 3A to be stored in the stable storage from the unstable storage of the node.

In step 322, a file manager (FM) of the node identifies a second node. In one or more embodiments of the invention, the second node includes the datum or data that is specified in the commit request. The file system server obtaining the unstable write request may forward the commit request to the file manager. In one or more embodiments of the invention, the second node is the second node discussed in FIG. 3A.

Similar to step 302 of the method illustrated in FIG. 3A, the file system server may modify the commit request to be in a format readable to the FM of the second node and forward the modified commit request.

In step 324, a commit request is sent to a file manager (FM) of the second node. In one or more embodiments of the invention, the commit request is the modified commit request obtained in step 322. The commit request may specify the data that is to be written to the storage device of the second node.

In one or more embodiments of the invention, the FM of the second node services the commit request. The FM of the second cookie may service the commit request by identifying the data that is to be written to the storage device and writing the data to the stable storage of the storage device of the second node. The data written to the stable storage may be obtained from the unstable storage of the second node.

In one or more embodiments of the invention, the second node may be rebooted during a time period after storing the data in unstable storage and prior to obtaining the commit request. The result of the second node rebooting includes: (i) the data associated with the commit request becomes inaccessible (i.e., the data is deleted) and (ii) the FM write cookie of the second node is replaced with a new FM write cookie. In other embodiments of the invention, the second node does not reboot during a time period after storing the data in unstable storage and prior to obtaining the commit request.

In such cases, the data associated with the commit request does not become inaccessible and the FM write cookie remains the FM write cookie of FIG. 3A.

In step 326, a service response is obtained from the FM of the second node. In one or more embodiments of the invention, the FM of the second node sends the service response after servicing the write request. The service response may include a FM write cookie and a node identifier. Depending on whether or not the second node rebooted during a time period after storing the data in unstable storage and prior to obtaining the commit request, the FM write cookie may or may not be a different FM write cookie (i.e., different that the FM write cookie that was sent in step 306).

In step 328, a determination is made about whether the obtained FM write cookie matches a stored FM write cookie in the node cookie hash table. In one or more embodiments of the invention, the stored FM write cookie is associated with an entry that includes a node identifier that is identical to the obtained node identifier. The file system server may compare the FM write cookie of the entry to the obtained FM write cookie to determine whether there is a match. If the obtained write cookie matches the stored FM write cookie, the method proceeds to step 332; otherwise, the method proceeds to step 330.

In step 330, the master verifier cookie is updated based on the FM write cookie. Additionally, the obtained FM write cookie is stored in the node cookie hash table. In one or more embodiments of the invention, the master verifier cookie is updated due to the obtained FM write cookie not matching the stored FM write cookie. The updated master verifier cookie may be generated by generating a new combination of characters, numbers, and/or symbols. The new combination may be generated in a random or deterministic manner without departing from the invention.

In step 332, the current master verifier cookie (which may or may not have been updated via step 330) is sent to the file system client. In one or more embodiments of the invention, the current master verifier cookie is the updated master verifier cookie generated in step 330. This is the case if the method follows step 330. Alternatively, the current master verifier cookie is the master verifier cookie generated after obtaining the unstable write request during the method of FIG. 3A. This is the case if the method follows step 328.

In one or more embodiments of the invention, the file system client obtaining the current master verifier cookie may use it to compare the current master verifier cookie to the master verifier cookie previously obtained in the method of FIG. 3A. If the current master verifier cookie matches the previously-obtained master verifier cookie, the file system client may determine that the commit request was serviced as expected. In contrast, if the current master verifier cookie matches the previously-obtained master verifier cookie, the file system client may determine that the commit request was not serviced as expected. The file system client may send additional write requests and/or commit requests to remediate the failed service.

Example

Figure 4A:
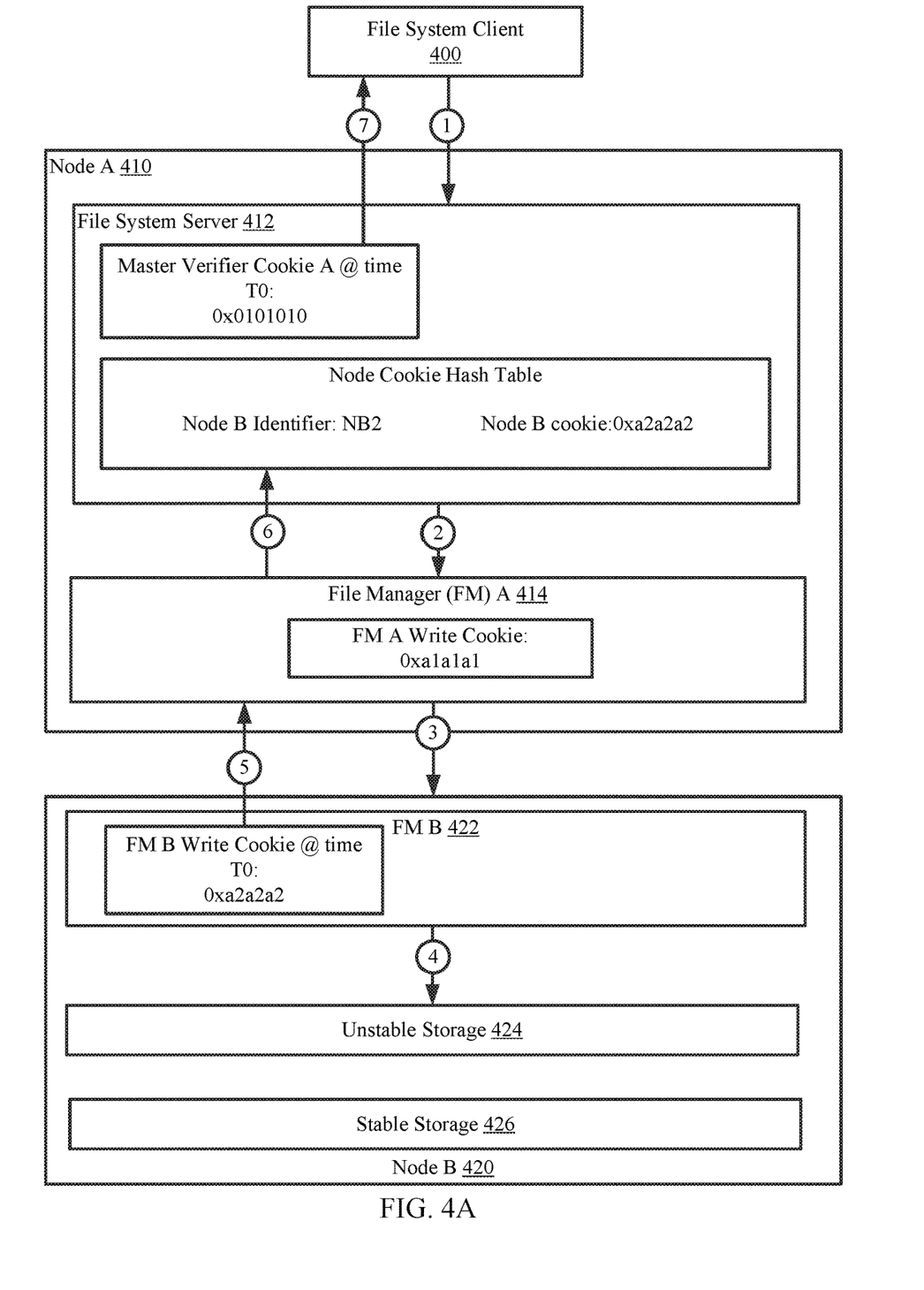
FIGS. 4A-4C show an example in accordance with one or more embodiments of the invention.
Figure 4B:
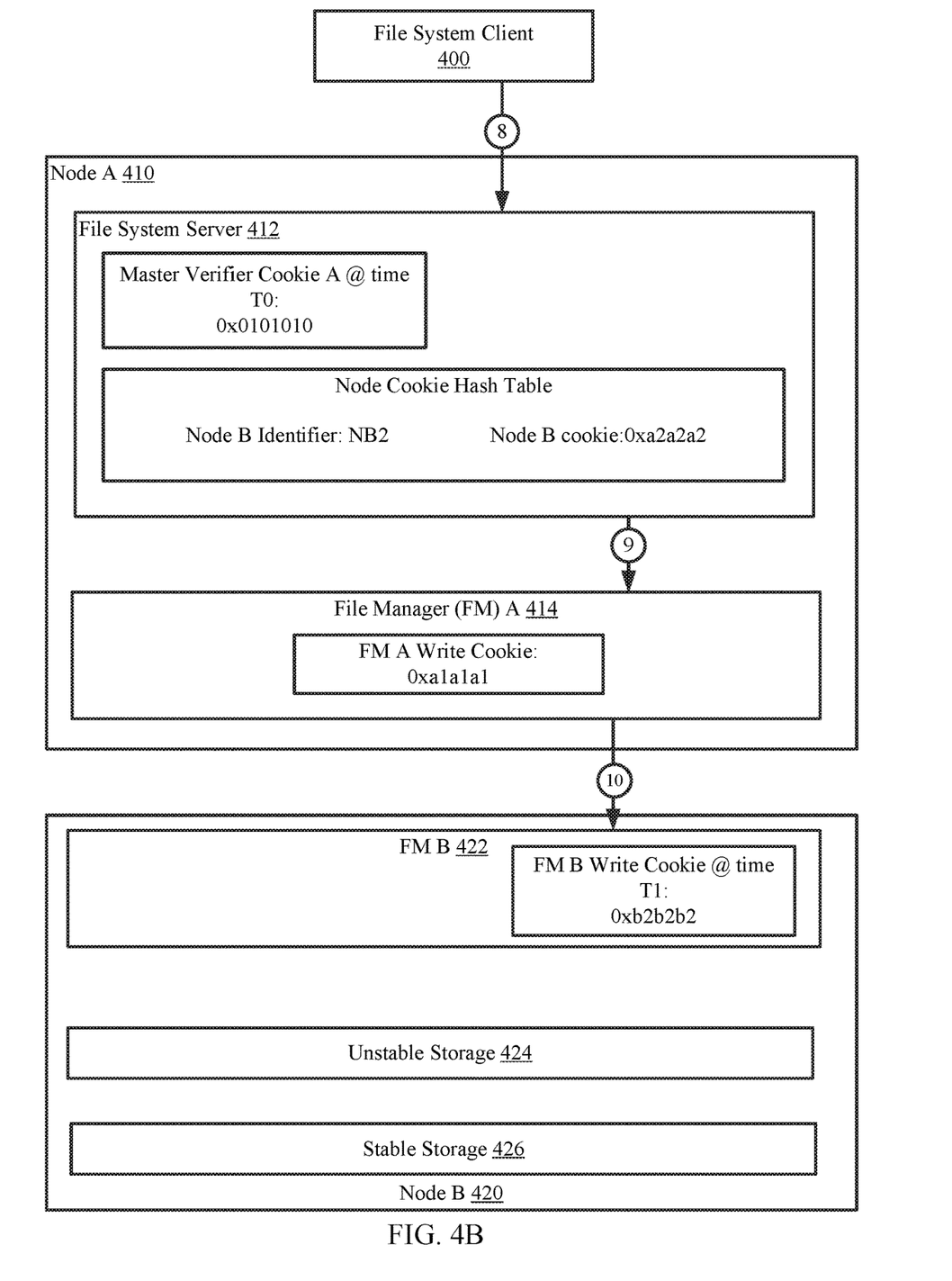
Figure 4C:
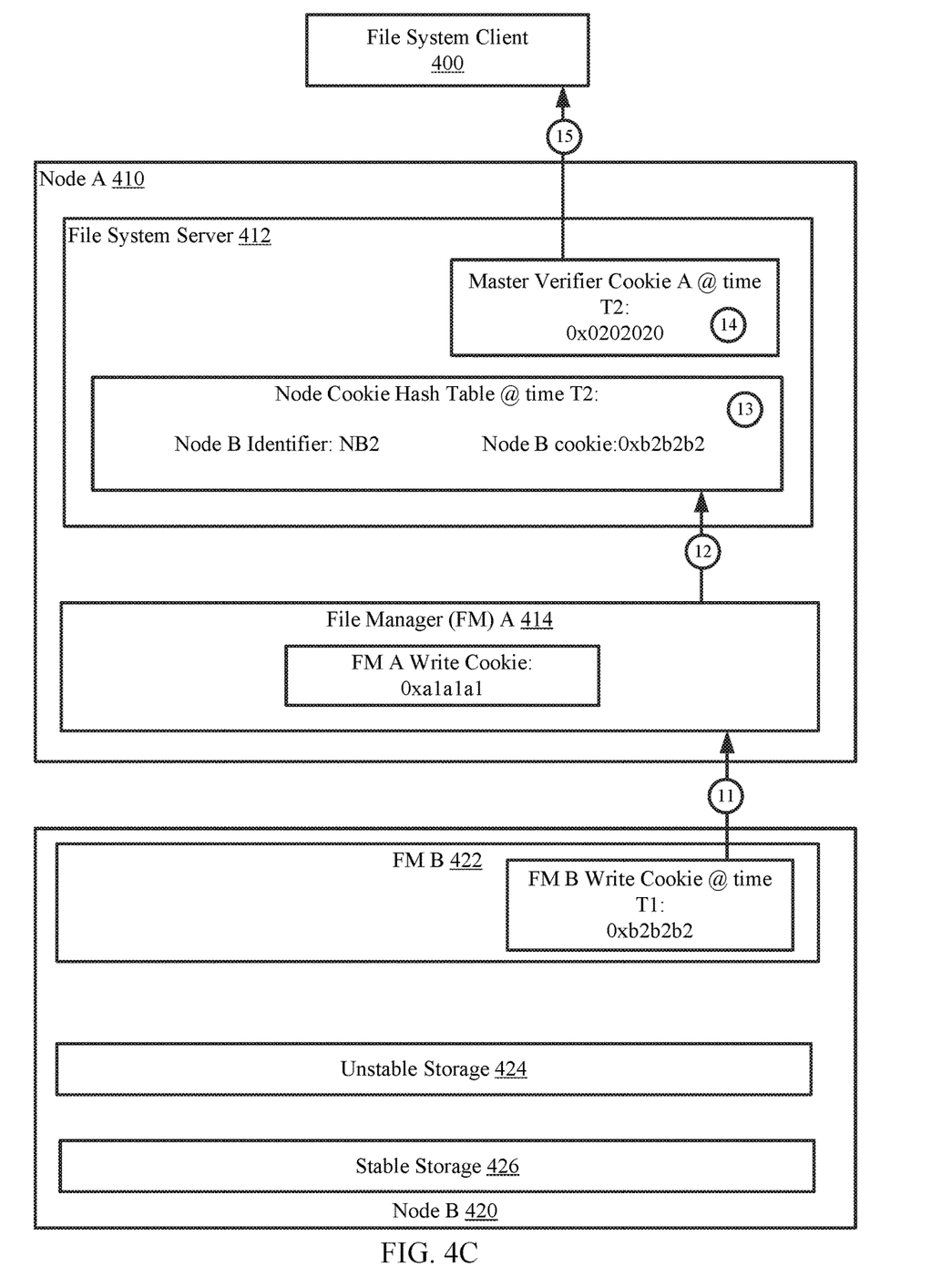

The following section describes an example. The example, illustrated in FIGS. 4A-4C, is not intended to limit the invention. Turning to the example, consider a scenario in which a file system client attempts to write data to a node. FIG. 4A shows a diagram of a file system client (400) communicating with a node A (410), which communicates with a node B (420). The file system client (400) may send an unstable write request to a file system server (412) of node A (410) [1]. The unstable write request may specify writing data to a file. The file may be stored in node B (420).

At a point in time prior to obtaining the unstable write request, file system server (412) includes a master verifier cookie at time T0 and a FM A write cookie. Node B (420) includes a file manager (422) that includes a FM B write cookie at time T0.

The file system server (412) may convert the unstable write request to a format readable to a file manager (FM) A of node A (410) and forward the converted write request to FM A (414) [2]. The FM A (414) may identify a file associated with the converted write request to identify a node in which the file is stored. The node may include a file manager that is able to service the converted write request. FM A (442) may identify node B (420) and send the converted write request to a FM B (422) of node B (420) [3].

FM B (422) may service the converted write request by writing to data specified in the converted write request and storing the data in unstable storage (424) [4]. FM B (422), after servicing the converted write request, may send a FM B write cookie generated at time T0 (i.e., 0xa2a2a2) to FM A (412) [5]. FM A (412) may forward the FM write cookie to the file system server (412), where the FM write cookie is stored in an entry of a node cookie hash table generated by the file system server (412) [6]. The entry may further include a node identifier for node B, which is where the FM write cookie was obtained.

After the node identifier and FM write cookie is obtained, the file system server (412) may send the master verifier cookie to the file system client (400), where the master verifier cookie (i.e., 0x0101010) will be stored [7].

At a point in time after sending the FM B write cookie (0xa2a2a2), node B (420) is rebooted. The result of the reboot includes a FM B write cookie being generated at a time T1, shown in FIG. 4B as 0xb2b2b2. Additionally, the result of the reboot is that no is available in the unstable storage (424).

FIG. 4B shows a diagram of the file system client (400) sending a request to the file system server (412) [8]. The request may be a commit request that specifies committing the data associated with the unstable write request of FIG. 4A. The data may be committed by storing the data stored in unstable storage (424) in stable storage (422). The file system server (412) may convert the commit request to a format readable to FM A (414). The file system server (412) may send the converted commit request to FM A (414) [9]. FM A (412) may forward the converted commit request to FM B (422) after identifying that the data is associated with a file stored in node B (420) [10].

FM B (422), after obtaining the converted commit request, determines that it is unable to service the converted commit request. FM B (422), following this determination, sends the FM write cookie generated at time T1 (0xb2b2b2) to FM A (414) [11]. FM A (414) forwards the FM write cookie to the file system server (412) [12]. The file system server (412) compares the obtained FM write cookie (0xb2b2b2) to the FM B write cookie (0xa2a2a2) stored in the node cookie hash table. The file system server (412) determines that the FM B cookie does not match the stored FM B write cookie. As a result, the file system server (412) updates the node cookie hash table at a time T2 [13]. Additionally, the file system server (412) updates the master verifier cookie (i.e., 0x0101010) by replacing it with a master verifier cookie at time T2 (i.e., 0x0202020) [14]. The master verifier cookie generated at time T2 (0x0202020) is sent to the file system client (400) [15].

The file system client (400) may compare the current master verifier cookie (0x0202020) associated with the commit request to the previously-obtained master verifier cookie (0x0101010) associated with the unstable write request and determine a mismatch. Subsequently, the file system client (400) may determine that the commit request was not serviced, and may perform a remediation based on the determination. The remediation may include sending an additional request to write the data to unstable storage (424) and/or to commit the data to stable storage (426).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of computing devices in determining whether data is properly written to another computing device. Embodiments of the invention include sending a master verifier cookie from a first computing device to a second computing device that is used to determine whether a third computing device is able to service a request to write data sent from the second computing device to the first computing device.

The third computing device may communicate with the first computing device by sending file manager (FM) write cookies that may be compared with previously-obtained FM write cookies to determine whether the third computing device serviced requests to write data. The first computing device may send a current master verifier cookie to the second computing device that the second computing device may compare to a previously-obtained master verifier cookie. The comparison may allow the second computing device, without communicating with the third computing device, to determine whether the third computing device serviced the request. The determination may be used to improve future requests to write data. For example, the second computing device may resend the requests to the first computing device until a determination is made by the second computing device that the requests are serviced.

Thus, embodiments of the invention may address the problem of inefficient use of computing resources. This problem arises due to the technological nature of the environment in which a clustered of nodes is used to service write requests, where the write requests are not serviced by the node that received the write request from the file system client.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for storing data, the method comprising:
 receiving, from a client and by a node, a commit request associated with a first datum, wherein the commit request specifies committing the first datum to a stable storage from an unstable storage;
 sending, in response to the commit request, a second commit request to a second node, wherein the second node comprises the first datum, and wherein the second commit request specifies storing the first datum in the stable storage, and wherein the stable storage is in the second node;
 after sending the second commit request, receiving a first cookie from the second node;
 making a first determination that the first cookie does not match a second cookie stored in a node cookie hash table, wherein the second cookie is associated with the second node as specified in the node cookie hash table;
 in response to the first determination, updating a master verifier cookie on the node to obtain an updated master verifier cookie, wherein the master verifier cookie is different from the first cookie and the second cookie; and
 sending the updated master verifier cookie to the client, wherein the first cookie and the second cookie are not sent to the client.

2. The method of claim 1, further comprising:
prior to receiving the commit request:
- receiving, from the client and by the node, a write request associated with the first datum;
- sending, in response to the write request, a second write request to the second node;
- after sending the second write request, receiving the second cookie from the second node;
- storing the second cookie in the node cookie hash table; and
- sending the master verifier cookie to the client.

3. The method of claim 1, further comprising:
prior to sending the second commit request to the second node, making a second determination that the first datum is stored on the second node.

4. The method of claim 1, wherein updating the master verifier cookie on the node to obtain the updated master verifier cookie comprises using a current time of the node when the updating is initiated.

5. The method of claim 2, further comprising:
generating the first cookie after the second node is rebooted.

6. The method of claim 5, wherein the second node is rebooted after the second cookie is sent to the node and before the second commit request is received by the second node.

7. The method of claim 5, wherein the first cookie is generated using a timestamp corresponding to when the second node is rebooted.

8. The method of claim 1, wherein the client is a file system client and wherein a file system server on the node receives the commit request.

9. The method of claim 8, wherein the file system server is a Network File System (NFS) Server and the file system client is a NFS client.

10. A non-transitory computer readable medium comprising computer readable program code, which when executed by a computer processor enables the computer processor to perform a method for storing data, the method comprising:
- receiving, from a client and by a node, a commit request associated with a first datum, wherein the commit request specifies committing the first datum to a stable storage from an unstable storage;
- sending, in response to the commit request, a second commit request to a second node, wherein the second node comprises the first datum, and wherein the second commit request specifies storing the first datum in the stable storage, and wherein the stable storage is in the second node;
- after sending the second commit request, receiving a first cookie from the second node;
- making a first determination that the first cookie does not match a second cookie stored in a node cookie hash table, wherein the second cookie is associated with the second node as specified in the node cookie hash table;
- in response to the first determination, updating a master verifier cookie on the node to obtain an updated master verifier cookie, wherein the master verifier cookie is different from the first cookie and the second cookie; and
- sending the updated master verifier cookie to the client, wherein the first cookie and the second cookie are not sent to the client.

11. The non-transitory computer readable medium of claim 10, the method further comprising:
prior to receiving the commit request:
- receiving, from the client and by the node, a write request associated with the first datum;
- sending, in response to the write request, a second write request to the second node;
- after sending the second write request, receiving the second cookie from the second node;
- storing the second cookie in the node cookie hash table; and
- sending the master verifier cookie to the client.

12. The non-transitory computer readable medium of claim 10, the method further comprising:
prior to sending the second commit request to the second node, making a second determination that the first datum is stored on the second node.

13. The non-transitory computer readable medium of claim 10, wherein updating the master verifier cookie on the node to obtain the updated master verifier cookie comprises using a current time of the node when the updating is initiated.

14. The non-transitory computer readable medium of claim 11, the method further comprising:
generating the first cookie after the second node is rebooted.

15. The non-transitory computer readable medium of claim 14, wherein the second node is rebooted after the second cookie is sent to the node and before the second commit request is received by the second node.

16. The non-transitory computer readable medium of claim 14, wherein the first cookie is generated using a timestamp corresponding to when the second node is rebooted.

17. The non-transitory computer readable medium of claim 10, wherein the client is a file system client and wherein a file system server on the node receives the commit request.

18. The non-transitory computer readable medium of claim 17, wherein the file system server is a Network File System (NFS) Server and the file system client is a NFS client.

19. A system, comprising:
a processor;
memory comprising instructions, which when executed by the processor, perform a method, the method comprising:
- receiving, from a client and by a node, a commit request associated with a first datum, wherein the commit request specifies committing the first datum to a stable storage from an unstable storage;
- sending, in response to the commit request, a second commit request to a second node, wherein the second node comprises the first datum, and wherein the second commit request specifies storing the first datum in the stable storage, and wherein the stable storage is in the second node;
- after sending the second commit request, receiving a first cookie from the second node;
- making a first determination that the first cookie does not match a second cookie stored in a node cookie hash table, wherein the second cookie is associated with the second node as specified in the node cookie hash table;
- in response to the first determination, updating a master verifier cookie on the node to obtain an updated master verifier cookie, wherein the master verifier cookie is different from the first cookie and the second cookie; and sending the updated master verifier cookie to the client, wherein the first cookie and the second cookie are not sent to the client.

20. The system of claim 19, the method further comprising:

prior to receiving the commit request:

receiving, from the client and by the node, a write request associated with the first datum;

sending, in response to the write request, a second write request to the second node;

after sending the second write request, receiving the second cookie from the second node;

storing the second cookie in the node cookie hash table; and sending the master verifier cookie to the client.

* * * * *